United States Patent Office 3,784,640
Patented Jan. 8, 1974

3,784,640
PROCESS FOR PREPARING α-METHYL-β-(3,4-DIHYDROXYPHENYL)-ALANINE
Kentaro Okumura, Kobe, and Kazuo Matsumoto and Mamoru Suzuki, Osaka, Japan, assignors to Tanabe Seiyaku Co., Ltd., Osaka, Japan
No Drawing. Filed Dec. 14, 1971, Ser. No. 207,950
Claims priority, application Japan, Dec. 29, 1970, 46/129,807
Int. Cl. C07c 101/72
U.S. Cl. 260—519   11 Claims

ABSTRACT OF THE DISCLOSURE

A lower alkyl ester of α-isocyano-propionic acid is condensed with a compound of the formula:

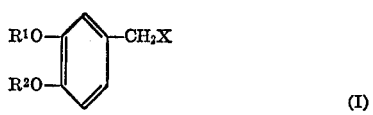

(I)

wherein each of $R^1$ and $R^2$ is lower alkyl, or $R^1$ and $R^2$ are combined together to form a methylene radical and X is halogen, to produce a compound of the formula:

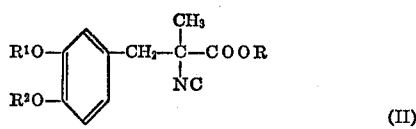

(II)

wherein R is lower alkyl, and $R^1$ and $R^2$ are as defined above. α-Methyl-β-(3,4-dihydroxyphenyl)-alanine is obtained by hydrolyzing the compound (II) with concentrated mineral acid. Alternatively, α-methyl-β-(3,4-dihydroxyphenyl)-alanine may be obtained by hydrolyzing compound (II) with dilute mineral acid to produce the corresponding α-methyl-β-phenylalanine ester, hydrolyzing the alanine ester with an alkali metal hydroxide to produce the corresponding α-methyl-β-phenylalanine, and then hydrolyzing some with concentrated mineral acid.

---

This invention relates to a process for preparing α-methyl-β-(3,4-dihydroxyphenyl)-alanine.

α-Methyl-β-(3,4-dihydroxyphenyl)-alanine (hereinafter designated as α-methyl DOPA) is useful as an anti-hypertensive agent.

Several methods of producing α-methyl DOPA are known. For example, it is prepared from 3,4-dimethoxyacetonitrile via α-methyl-α-amino-β-(3,4-dihydroxyphenyl)-propionitrile or 5-methyl-5-(3,4-dimethoxyphenyl)-hydantoin (Journal of the American Chemical Society, vol. 77 (1955), page 700). Alternatively, α-methyl DOPA may be prepared from safrole via 5-methyl-5-(3,4-methylenedioxyphenyl)-hydantoin (Japanese patent publication No. 11,211/1964). We have now found a novel method for preparing α-methyl DOPA in a higher yield.

According to the present invention, α-methyl DOPA can be prepared by condensing a lower alkyl ester of α-isocyano-propionic acid with a benzyl halide compound of the formula:

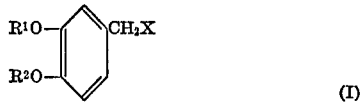

(I)

wherein each of $R^1$ and $R^2$ is lower alkyl, or $R^1$ and $R^2$ are combined together to form a methylene radical and X is halogen, and hydrolyzing the resultant α-methyl-α-isocyano-β-phenyl-propionate compound of the formula:

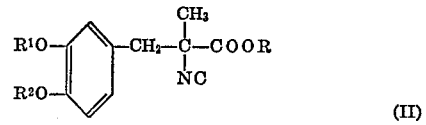

(II)

wherein R is lower alkyl, and $R^1$ and $R^2$ are as defined above.

The condensation reaction of the invention can be carried out in the presence of a basic catalyst in a suitable solvent. Preferred examples of said catalyst include an alkali metal (e.g., sodium metal, potassium metal), an alkali metal alkoxide (e.g., sodium methoxide, sodium ethoxide, potassium methoxide), an alkali metal hydride (e.g., sodium hydride, potassium hydride), an alkali metal amide (e.g., sodium amide, potassium amide) and an alkali metal salt (e.g., sodium cyanide, potassium cyanide, sodium bicarbonate, sodium carbonate). Tetrahydrofuran, dioxane, benzene and toluene are suitable as the reaction solvent. It is preferred to carry out the reaction at 0° to 60° C., especially at 30° to 40° C. The reaction product thus obtained can be employed in the subsequent step without isolation and/or purification. If required, however, the product (II) may be recovered in a pure state. The isolation and/or purification thereof may be conducted in a conventional manner.

The hydrolysis of the present invention can be carried out as follows. α-Methyl-α-isocyano-β-phenyl-propionate compound (II) may be directly converted to α-methyl DOPA by hydrolyzing said propionate with concentrated mineral acid under heating. The reaction is preferably carried out at 70° to 130° C., especially at 90° to 110° C. An aqueous solution containing more than 20 w./w. percent of hydrochloric, hydrobromic, hydroiodic or sulfuric acid is employed as the concentrated mineral acid.

Alternatively, α-methyl-α-isocyano-β-phenyl-propionate compound (II) may be hydrolyzed with dilute mineral acid to produce α-methyl-3-phenyl-alanine ester compound of the formula:

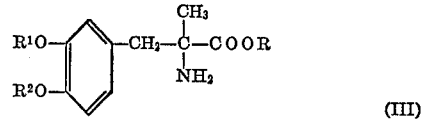

(III)

wherein R, $R^1$ and $R^2$ are as defined above. In this alternative method, it is preferred to carry out the reaction at 30° to 60° C., especially at 40 to 50° C. An aqueous solution containing less than 10 w./w. percent of hydrochloric, hydrobromic, hydroiodic or sulfuric acid is suitably employed as the dilute mineral acid. Furthermore, an alkanol of one to four carbon atoms (e.g., methanol, ethanol), an alkanoic acid of one to four carbon atoms (acetic acid, formic acid), water or mixture thereof may be employed as the reaction solvent. If required, the intermediate product (III) thus obtained may be further subjected to partial hydrolysis with an alkali metal hydroxide to produce α-methyl-β-phenyl-alanine compound of the formula:

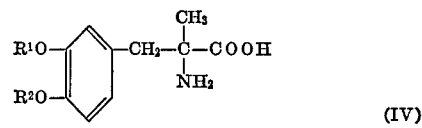

(IV)

wherein $R^1$ and $R^2$ are as defined above. The hydrolysis with alkali metal hydroxide is preferably carried out at 20° to 60° C., especially at 40° to 50° C. Suitable examples of the alkali metal hydroxide include potassium hydroxide and sodium hydroxide. Water and an aqueous alkanol such as aqueous methanol or aqueous ethanol are suitable as the reaction solvent.

The reaction products (III) and (IV) thus obtained may be readily converted to α-methyl DOPA by hydrolyzing each of said products with the aforementioned concentrated mineral acid under heating at 70° to 130° C., especially at 90° to 110° C. α-Methyl DOPA may be recovered from the reaction solution in a conventional manner.

Practical and presently-preferred embodiments of the present invention are shown in the following examples.

EXAMPLE 1

A mixture of methyl α-isocyano-propionate, 37.65 g. of 3,4-dimethoxybenzyl bromide and 135 ml. of tetrahydrofuran is added gradually, at room temperature and under stirring, to a suspension of 6.3 g. of 69% sodium hydride in 225 ml. of tetrahydrofuran. The resultant mixture is stirred for 2 hours at the same temperature. After the reaction is completed, the mixture is evaporated to remove solvent. The residue thus obtained is dissolved in ethyl acetate. The ethyl acetate solution is washed with water, dried and then evaporated to remove solvent. 41.8 g. of methyl α-methyl-α-isocyano-β-(3,4-dimethoxyphenyl)-propionate are obtained.

30.1 g. of the methyl α-methyl-α-isocyano-β-(3,4-dimethoxyphenyl)-propionate are dissolved in 140 ml. of a mixture of 2 N-hydrochloric acid and methanol. The solution is heated at 50° C. for an hour. Then, the reaction solution is concentrated under reduced pressure to remove solvent. Ether is added to the residue and the crystalline precipitates is collected by filtration. 39 g. of α-methyl-β-(3,4-dimethoxyphenyl)-alanine methyl ester hydrochloride are obtained.

Nuclear magnetic resonance spectrum (in $D_2O$): τ: 3.5 (m., 3H), 6.35 (S, 3H, $COOCH_3$), 6.4 (S, 6H, $OCH_3$), 7.1 (d., 2H, $CH_2$), 8.55 (S, 3H, $CH_3$).

Thin layer chromatography: $R_f$-value=0.7 (on a silica-gel plate: Solvent, chloroform-methanol-acetic acid (85:15:3)).

The 39 g. of α-methyl-β-(3,4-dimethoxyphenyl)-alanine methylester hydrochloride are dissolved in 290 ml. of 1 N-sodium hydroxide solution. The resultant solution is allowed to stand for 12 hours at room temperature. The solution is washed with benzene, and then adjusted to pH 8 with concentrated hydrochloric acid. The crystalline precipitate is collected by filtration. The crystals are washed with water. 29 g. of α-methyl-β-(3,4-dimethoxyphenyl)-alanine are obtained. Yield: 90% M.P. 271°–273° C. (decomp.).

Nuclear magnetic resonance spectrum (in $CF_3COOD$): τ: 3.0 (S, 3H, aromatic), 5.5 (q., 2H, $CH_2$), 6.0 (S, 6H, $OCH_3$), 8.0 (S, 3H, $C-CH_3$).

6.0 g. of the α-methyl-β-(3,4-dimethoxyphenyl)alanine are dissolved in 100 ml. of 48% hydrobromic acid. The resultant solution is refluxed for 8 hours in nitrogen atmosphere. Then, the solution is concentrated under reduced pressure in nitrogen atmosphere. Water is added to the residue, and the aqueous solution is concentrated under reduced pressure to remove hydrobromic acid (this operation is repeated three times). The residue thus obtained is dissolved in 50 ml. of water. The aqueous solution is adjusted to pH 6.5 with concentrated aqueous ammonia. Sulfur dioxide gas is introduced into the aqueous solution to decolorize it. Then, the solution is concentrated to 40 ml. in nitrogen atmosphere. The concentrated solution is allowed to stand over night, and the crystalline precipitate is collected by filtration. 4.3 g. of α-methyl-β-(3,4-dihydroxyphenyl)-alanine are obtained. M.P. 298°–300° C. (decomp.). The physicochemical properties of this product are identical with those of an authentic sample.

EXAMPLE 2

A mixture of 3.33 g. of methyl α-isocyanopropionate, 7.08 g. of 3,4-methylenedioxybenzyl bromide and 30 ml. of tetrahydrofuran is added gradually, at room temperature and under stirring, to a suspension of 1.39 g. of 69% sodium hydride in 50 ml. of tetrahydrofuran. The resultant mixture is stirred for 2 hours at the same temperature. After the reaction is completed, the mixture is evaporated to remove solvent. The residue thus obtained is dissolved in ethyl acetate. The ethyl acetate solution is washed with water, dried and then evaporated to remove the solvent. 7.0 g. of methyl α-methyl-α-isocyano-β-(3,4-methylenedioxyphenyl)-propionate are obtained.

Infrared absorption spectrum:

$\nu_{max}^{film}$: 2130 (—N≡C), 1750 (—$COOCH_3$) cm.$^{-1}$ 5.0 g. of the methyl α-methyl-α-isocyano-β-(3,4-methylenedioxyphenyl)-propionate are dissolved in 50 ml. of a mixture of 2 N-hydrochloric acid and methanol. The resultant solution is heated at 50° C. for 30 minutes. Then, the reaction solution is concentrated under reduced pressure to remove the solvent. Methanol is added to the residue. The methanol solution is concentrated to dryness under reduced pressure. Ether is added to the residue, and the crystalline precipitate is collected by filtration. The crystals are recrystallized from a mixture of ethanol and ether. 5.3 g. of α-methyl-β-(3,4-methylenedioxyphenyl)-alanine methyl ester hydrochloride are obtained. Yield: 95%.

Nuclear magnetic resonance spectrum (in $D_2O$): τ:3.3(m, 3H),

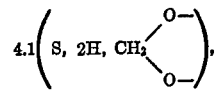

6.2(S, 3H, $COOCH_3$), 6.9(d, 2H, —$CH_2$—), 8.45(S, 3H, $CH_3$).

2.7 g. of the α-methyl-β-(3,4-methylenedioxyphenyl)-alanine methyl ester hydrochloride are dissolved in 17 ml. of 1 N-sodium hydroxide solution. The resultant solution is allowed to stand for 12 hours at room temperature. The solution is adjusted to pH 8 with concentrated hydrochloric acid. Crystalline precipitate is collected by filtration. 0.85 g. of α-methyl-β-(3,4-methylenedioxyphenyl)-alanine is obtained. Yield: 95% M.P. 266°–268° C. (decomp.)

0.8 g. of the α-methyl-β-(3,4-methylenedioxyphenyl)-alanine is dissolved in a mixture of 5 ml. of acetic acid and 15 ml. of 48% hydrobromic acid. The solution is refluxed for 6 hours in nitrogen atmosphere. Then, the solution is concentrated under reduced pressure in nitrogen atmosphere. Water is added to the residue, and the aqueous solution is concentrated under reduced pressure to remove hydrobromic acid. The residue thus obtained is dissolved in 3 ml. of water. The aqueous solution is adjusted to pH 6.5 with a concentrated ammonia. Sulfur dioxide gas is introduced into the aqueous solution to dicolorize it. The aqueous solution is concentrated to one ml. in nitrogen atmosphere. Then, the concentrated solution is adjusted to pH 6.5 with concentrated ammonia. Ethanol is added to the solution, and the crystalline precipitate is collected by filtration. 0.5 g. of α-methyl-β-(3,4-dihydroxyphenyl)-alanine is obtained. M.P. 298°–300° C. (decomp.). The physico-chemical properties of this product are identical with those of an authentic sample.

What we claim is:

1. A process for preparing α-methyl-β(3,4-dihydroxyphenyl)-alanine which comprises the steps of
   (A) condensing a lower alkyl ester of α-isocyanopropionic acid with a compound of the formula:

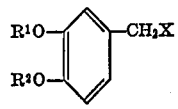

(I)

wherein each of $R^1$ and $R^2$ is lower alkyl or $R^1$ and $R^2$ are combined together to form a methylene radical and X is halogen, to produce a compound of the formula:

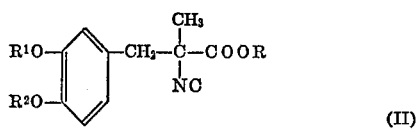

wherein R is lower alkyl, and R¹ and R² are as defined above, said condensation being carried out at a temperature of 0° to 60° C., in the presence of a basic catalyst selected from the group consisting of alkali metals, alkali metal alkoxides, alkali metal hydrides, alkali metal amides, and alkali metal salts, and in a solvent selected from the group consisting of tetrahydrofuran, dioxane, benzene and toluene, and (B)(a) hydrolyzing the compound (II) with concentrated mineral acid, at a temperature of 70° C. to 130° C., said α-methyl-β-(3,4-dihydroxyphenyl)-alanine, or (b) hydrolyzing the compound (II) at a temperautre of 30° to 60° C. and in a reaction solvent selected from the group consisting of alkanols having 1 to 4 carbon atoms, alkanoic acids having 1 to 4 carbon atoms, water, and mixtures thereof, with dilute mineral acid to produce a compound of the formula:

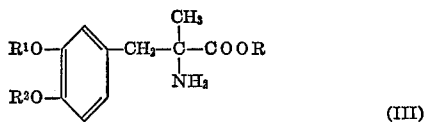

wherein R¹, R² and R are as defined above, and hydrolyzing the compound (III) with concentrated mineral acid at a temperature of 70° to 130° C. to produce said α-methyl-β-(3,4-dihydroxyphenyl)-alinine or hydrolyzing compound (III) with an alkali metal hydroxide at a temperature of 20° to 60° C. and in water or aqueous alkanol, to produce a compound of the formula:

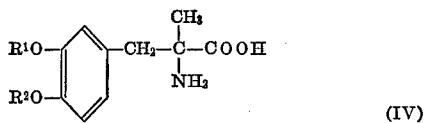

wherein R¹ and R² are as defined above and then hydrolyzing the compound (IV) with concentrated mineral acid at a temperature of 70° to 130° C. to produce said α - methyl - β-(3,4-dihydroxyphenyl)-alinine.

2. The process according to claim 1 wherein the basic catalyst is sodium, potassium, sodium ethoxide, potassium methoxide, sodium hydride, potassium hydride, sodium amide, potassium amide, or sodium carbonate.

3. The process according to claim 1 wherein the condensation reaction is carried out at 30° to 40° C.

4. The process according to claim 1 wherein the hydrolysis of the compound (II), (III) or (IV) with concentrated mineral acid is carried out at 90° to 110° C.

5. The process according to claim 1 wherein an aqueous solution containing more than 20 w./w.% of hydrochloric, hydrobromic, hydroiodic or sulfuric acid is employed as the concentrated mineral acid.

6. The process according to claim 1 wherein the hydrolysis of the compound (II) with dilute mineral acid is carried out at 40° to 50° C.

7. The process according to claim 1 wherein an aqueous solution containing less than 10 w./w. percent of hydrochloric, hydrobromic, hydroiodic or sulfuric acid is employed as the dilute mineral acid.

8. The process according to claim 1 wherein the hydrolysis of the compound (III) with alkali metal hydroxide is carried out at 40° to 50° C.

9. The process according to claim 1 wherein the reaction solvent employed in hydrolyzing the compound (II) with dilute mineral acid is selected from the group consisting of methanol, ethanol, acetic acid, formic acid, water and mixtures thereof.

10. The process according to claim 1 wherein the hydrolysis of the compound (III) is carried out with an alkali metal hydroxide selected from the group consisting of potassium hydroxide and sodium hydroxide.

11. The process according to claim 1 wherein the hydrolysis of the compound (III) with alkali metal hydroxide is carried out in water or aqueous ethanol.

References Cited
UNITED STATES PATENTS
3,712,911   1/1973   Schoellkopf _____ 260—465 R FOREIGN PATENTS
2,063,502   6/1972   W. Germany _____ 260—519

OTHER REFERENCES
Ohta, Chemical Abstracts, vol. 48, p. 4440g (1954).
Angewandie Chemie, vol. 77, pp. 495–500 (1965).
Angew. Chem. International Edition (English), vol. 10(5), 1971, pp. 331–33.
March, Advanced Organic Chemistry: Reactions, Mechanisms and Structure, 1968, pp. 724–25.

LORRAINE A. WEINBERGER, Primary Examiner
R. J. HAGAN, Assistant Examiner

U.S. Cl. X.R.
260—340.5, 465 D, 471 A